United States Patent [19]
Leonhardt et al.

[11] Patent Number: 5,619,384
[45] Date of Patent: *Apr. 8, 1997

[54] SYSTEM FOR PROVIDING TRANSPARENT STORAGE OF DATA EMBEDDED WITHIN PREDEFINED RECORDING FORMATS

[75] Inventors: Michael L. Leonhardt, Longmont; Charles A. Milligan, Golden, both of Colo.

[73] Assignee: Storage Technology Corporation, Louisville, Colo.

[ * ] Notice: The term of this patent shall not extend beyond the expiration date of Pat. No. 5,619,384.

[21] Appl. No.: 186,803

[22] Filed: Jan. 25, 1994

[51] Int. Cl.[6] .................................................. G11B 5/09
[52] U.S. Cl. .................................................. 360/48; 360/50
[58] Field of Search .............................. 360/48, 50, 53, 360/60

[56] References Cited

U.S. PATENT DOCUMENTS

| | | | |
|---|---|---|---|
| 4,899,232 | 2/1990 | Odaka et al. | 360/48 |
| 4,914,530 | 4/1990 | Graham et al. | 360/50 |
| 5,172,381 | 12/1992 | Karp et al. | 360/48 X |
| 5,182,679 | 1/1993 | Nishimura | 360/48 |
| 5,189,566 | 2/1993 | Christensen et al. | 360/53 |
| 5,210,851 | 5/1993 | Kato et al. | 360/48 |
| 5,321,558 | 6/1994 | Tackett | 360/48 |
| 5,384,668 | 1/1995 | Shih et al. | 360/48 |

*Primary Examiner*—W. C. Kim
*Attorney, Agent, or Firm*—Duft, Graziano & Forest, P.C.

[57] ABSTRACT

A method is described which provides various new data storage system capabilities by using data storage structures within industry standard (or other pre-existing) formats used with data recording devices employing removable media. The data storage structures used by the present method comprise formats which contain regions previously marked as "contents of this region are not of interest" or marked as "no data was recorded within this region". These data storage structures are thus transparent to present data recording devices so as not to disrupt their data processing functions. However, the data storage structures are available to be used by new data recording devices (or old devices that have been updated) so that new data embedded therein may be used to enhance the functionality of the system which utilizes the data storage structures. The types of embedded data may include ECC (error correction codes), tape position information, audit information, security information, mount history, media defect history, authentication notation, generation-identification notation, etc.

13 Claims, 12 Drawing Sheets

SYSTEM FOR PROVIDING TRANSPARENT STORAGE OF DATA EMBEDDED WITHIN PREDEFINED RECORDING FORMATS

FIELD OF THE INVENTION

This invention relates to data storage systems employing removable media and, in particular, to a system which uses data transparently imbedded within industry standard data formats to provide increased functionality when implemented with enhanced data recording devices, and which system also allows backward compatibility with existing, unenhanced data recording devices.

PROBLEM

It is a problem in the field of high performance data storage systems to produce a data recording device that has significant new functionality without the simultaneous introduction of changes in all elements of a system including media, data format on the media, new device architecture and host software support for the new device. Such host software support is often complex and typically necessitates extensive host computer operating system modifications. This software support requirement makes it very expensive for manufacturers to introduce such new devices, which in turn limits the introduction of new functionality such that it is made available to the industry only by way of major product changes. Incremental introduction of new functionality is thus nearly prohibited because of this problem.

This problem of software support for new data recording devices is equally troublesome to a user of the new devices because of the situation created by the existence of a large base of installed sets of media and drives, and the existence of procedures, data management processes, and application software that expect certain functionality to be maintained (i.e., the "installed base inertia").

The problem is further exacerbated when the data storage system is constrained by various industry-recognized standards which generally set very specific and stringent requirements and limits on functionality. In certain instances, these standards even inadvertently exclude the ability to introduce new functionality without some change to the standard or creation of new standards.

SOLUTION

The above described problems are solved, and a technical advance achieved in the field by this invention which provides various new data storage system capabilities by using data storage structures within industry standard (or other pre-existing) formats used with data recording devices employing removable media. These industry standard formats include formats defined by the ANSI committee, the ISO, and the ECMA. The data storage structures used by the present method define formats which contain regions previously marked as "contents of this region are not of interest" or marked as "no data was recorded within this region". Such regions are hereinafter referred to as areas "not of interest" or "not recorded." These data storage structures are thus transparent to present data recording devices so as not to disrupt their data processing functions. However, the data storage structures are available to be used by new data recording devices (or old devices that have been updated) so that new data contained therein may be used to enhance the functionality of the system which utilizes the data storage structures.

Conventional, unenhanced data recording devices employ a protocol which, in accordance with the particular industry standard format, avoids processing any data contained in these "not of interest" or "not recorded" areas (e.g., the devices ignore recording signals encountered while moving through these areas to the next industry standard-defined area of interest).

For example, certain existing magnetic tape formats reserve areas on the tape media that are written with a specific sequence of non-data frequency tones ("gap tones"). Particular areas within these gap tone regions can be entirely devoid of gap tone frequencies without causing any malfunction of the data recording device during reading of the media. The present system utilizes these areas (and other conventionally non-used areas) to store information used to enhance data storage system capabilities.

Another conventionally non-used area on tape media is an "erase gap" area which is normally used to denote an area containing defects in the tape media that cannot be reliably over-written. The present system also utilizes erase gap areas to store information for enhancing the capabilities of a data storage system. Although some conventional recording systems use erase gaps as "reserved" areas, these areas cannot be used by conventional systems to "hide" data from other conventional systems. These so-called "reserved" areas, when later over-written with data, are also overwritten with standard gap tones so that these areas appear exactly as other normally written-to areas of the media.

In general, the present system comprises taking an existing data format and overlaying thereon a "template" which redefines areas previously identified as "not recorded" or "not of interest", and embeds various types of information in such areas. The types of embedded information may include, but are not limited to, ECC (error correction codes), tape position information, audit information, security information, mount history, media defect history, authentication notation, generation-identification notation, etc.

By using embedded information for error recovery purposes, for example, the present system allows an improvement of up to three orders of magnitude in the length of error bursts which can be corrected. This means if a conventional data recording device is capable of correcting error bursts of $10^{15}$ bits in length, then the same device employing embedded error correction information can correct error bursts of up to $10^{18}$ bits.

Furthermore, the present system can provide a significantly faster and more accurate search capability when tape position information is embedded in erase gaps in magnetic tape media.

BRIEF DESCRIPTION OF THE DRAWING

The present invention may be better understood from a reading of the following description thereof taken in conjunction with the drawing in which.

DETAILED DESCRIPTION OF THE INVENTION

Definitions

The following terms are used throughout this document:

The terms "not of interest" or "not recorded" describe regions previously marked as "contents of this region are not of interest" or marked as "nothing (or no data) was recorded within this region", and are defined as such within industry standard (or other pre-existing) formats used with data recording devices employing removable media.

The term "unenhanced device" refers to a standard removable media recording device which performs read/write operations according to predefined protocols which use industry standard or other predefined media formats.

The term "enhanced device" refers to a removable media recording device which functions in accordance with the system of the present invention by embedding data in areas "not of interest" to unenhanced devices. Media written-to by an "enhanced device" is also capable of being read by "unenhanced" devices expecting industry standard or other predefined formats.

Reference numbers having the form "nnn-*" should be interpreted in accordance with the convention that "nnn" represents a reference number with the leading digit indicating the Figure number, with the character "*" indicating that the specified reference number applies to a plurality of similar entities.

Figure 1:
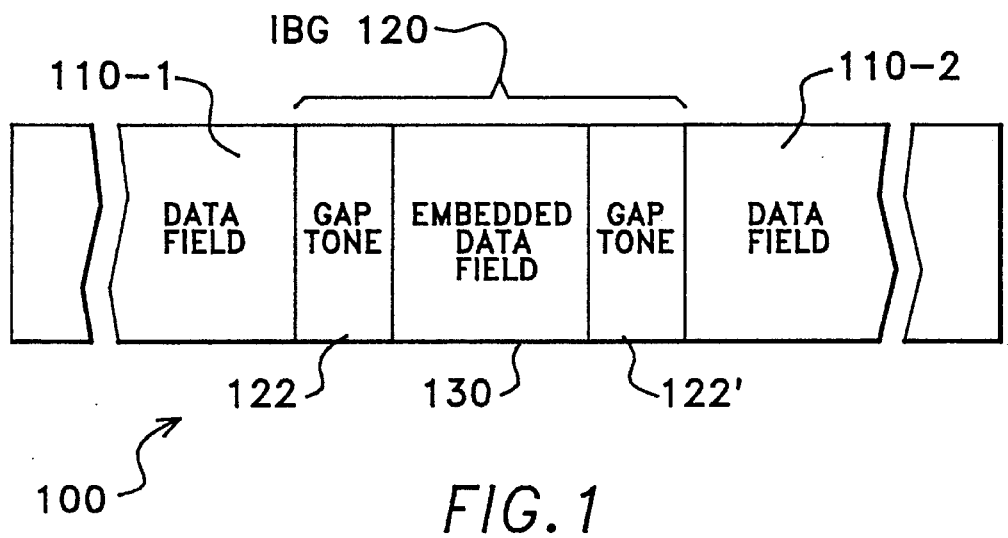
FIG. 1 illustrates the format of an interblock gap in a typical 3480/90 tape media system.

For purposes of illustration, the following examples employ the industry standard 34xx magnetic tape device/media/format. It is to be understood that the present system could be employed with both tape and non-tape media (such as disk drives), as well as optical recording devices. FIG. 1 illustrates an industry standard format used with 3480/90 tape media systems.

As shown in FIG. 1, the 34xx format defines an IBG (interblock gap) 120-* between each of the data blocks 110 written to tape media 100. Each IBG 120-* is defined to contain a "gap tone", which is written with a specific sequence of non-data frequency tones. The gap tone is allowed to be discontinuous between area 122, which is the first ¼ of IBG 120-*, and area 122', which is the last ¼ of the IBG 120-*. This middle half 130 of the IBG area 120 can be entirely devoid of gap tone frequency signals without causing any malfunction of the data recording device during reading of the media 100. This middle area 130 of an IBG 120-* (hereinafter referred to as a "embedded data field") is one of the areas used by the present system for storage of supplementary data used to enhance data storage system capabilities. The format of an embedded data field is described in detail below with respect to FIG. 3. Note that according to the ANSI Std. X3B5 format, valid gap tones need to be interspersed every 0.03 millimeters within the IBG, however, all known manufacturers require no gap tone in this middle area 130 of the IBG region 120.

Figure 2:
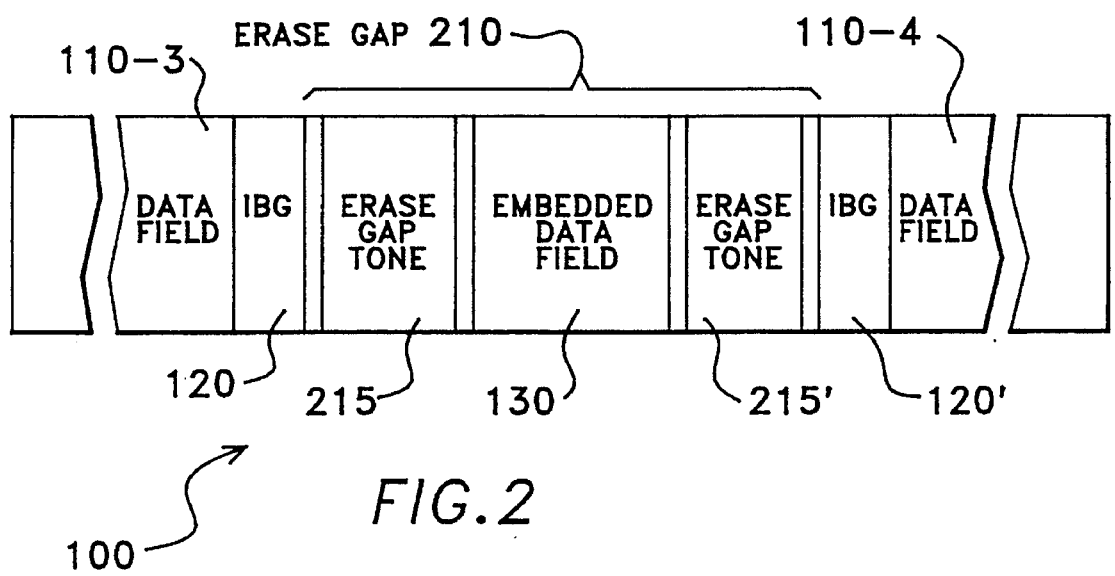
FIG. 2 illustrates the format of an erase gap in a typical 3480/90 tape media system.

Another technique for embedding data within an existing format uses "erase gaps" to provide more flexibility and allow larger blocks of embedded data to be written than the above method of embedding data within IBGs. FIG. 2 illustrates the format of an erase gap 210 in a typical 3480/90 tape media recording system. There are occasional defects in tape media 10p that cannot be reliably over-written, so the 34xx protocol allows these areas to be marked and skipped over. This well-known procedure entails writing another series of tone frequencies that delineate the beginning of such an area to be skipped, called an "erase gap" 210. During normal operation, when an erase gap 210 is encountered, an "unenhanced" data recording device physically moves the tape a specified distance and then looks for a valid gap tone which delineates the beginning of the next data block 110. However, an "enhanced" recording device employing the present system looks to see whether any embedded data is present in the erase gap 210 before proceeding to skip the erase gap 210.

Figure 3:
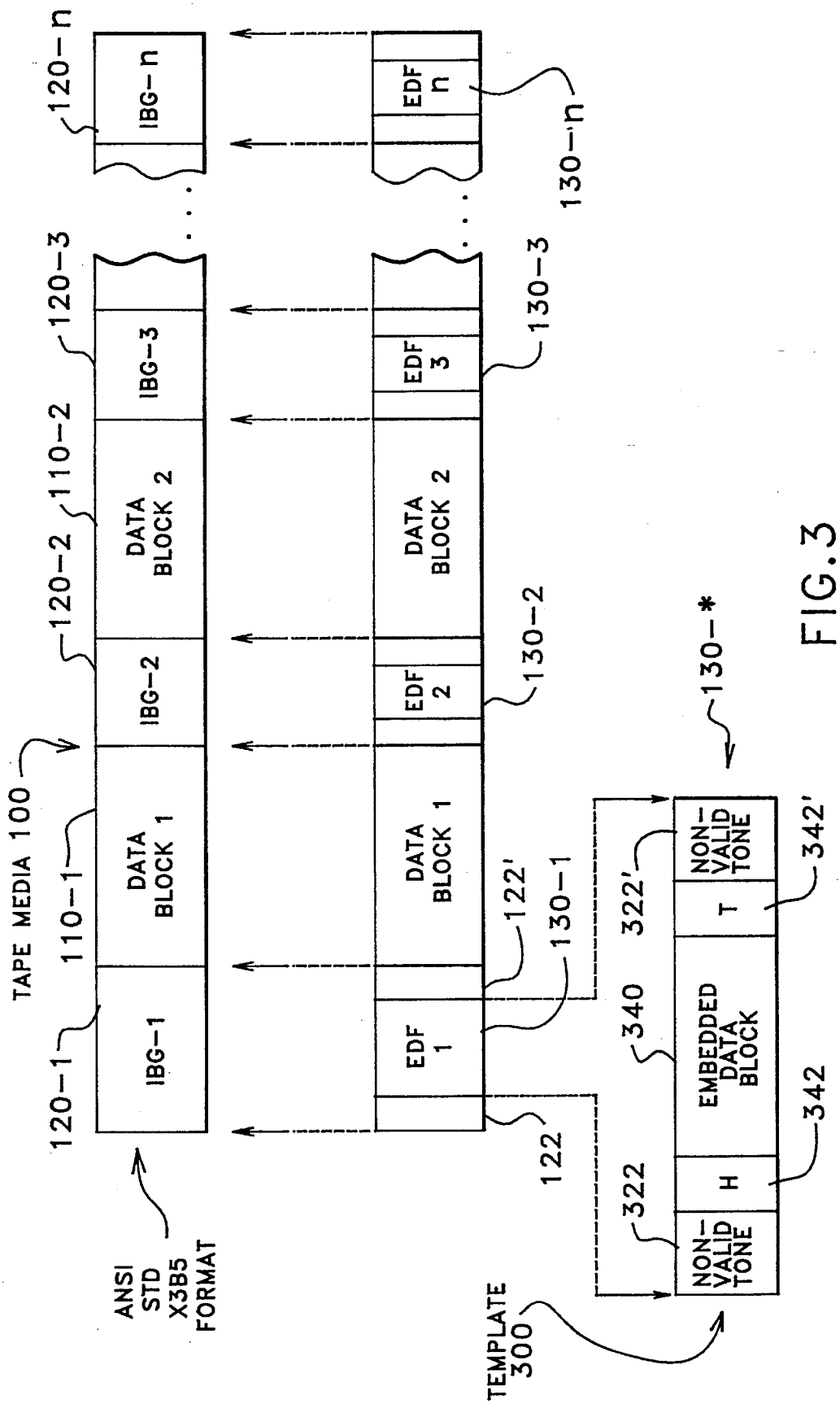
FIG. 3 shows a "template" in accordance with the present system.

Each erase gap 210 immediately follows an IBG and comprises a leading erase gap tone 215 followed by an embedded data field 130, which has the same format as embedded data field (EDF) 130-1 located in IBG 120-1 (see FIG. 3). A trailing erase gap tone 215' delineates the end of the erase gap and immediately precedes another IBG 120'. Note that some recording devices do not require trailing erase gap tone 215'.

The present system thus allows a conventional "unenhanced" device to read media containing embedded data while ignoring the embedded data. An "enhanced" device, however, may take advantage of the embedded data for purposes such as providing enhanced error recovery, etc.

This same protocol of marking "poor" recording areas is also used in both magnetic and optical disk devices via a procedure called "demarking" or "linear replacement". In a demarking operation, a pointer is used to indicate an alternative spare recording area that has been reserved. "Sector skipping" is also a well-known technique used to mark unrecordable areas on rotating media, and this technique could be used in a manner analogous to that of demarking. In all of these cases the existing format allows an area to be marked as "not used" and the present technique for providing "transparent storage" of embedded data allows such marks to be used to embed supplementary data in order to provide enhanced functionality for "enhanced" devices capable of detecting such embedded data.

Template Concept

FIG. 3 shows a "template" 300 in accordance with the present system which comprises taking an existing data format and overlaying thereon a template 300 which redefines areas previously identified as "not of interest" or "not recorded". Various types of information are then embedded in such areas. This embedded data is transparent to conventional ("non-enhanced") recording devices which are not looking for embedded data. However, a recording device which has been enhanced to detect the special data or tone sequences provided by the present system can locate and retrieve the embedded data. This "template" concept is shown in FIG. 3, which uses the ANSI standard X3B5 format for recorded data on magnetic tape as an example of an industry standard format with which the present system can be employed. As shown in FIG. 3, a length of magnetic tape 100 formatted under ANSI standard X3B5 contains a plurality of data blocks 110-* separated by interblock gaps (IBGs) 120-*. Certain areas within these IBGs may be used for storing "embedded data" in accordance with the present system.

As shown in FIG. 3, template 300 subdivides each IBG 120-* on tape media 100 into areas 122 and 122', which contain valid gap tones, and an embedded data field 130-*. Embedded data field 130-1 is shown further subdivided into areas 322/322', which contain non-valid tones, and embedded data block 340, which is bounded by areas 342/342γ, which function as header and trailer, respectively, for the embedded data block 340. Areas 322/322' contain a special tone or data pattern which can comprise any format except a valid tone pattern as defined by the ANSI format specification. For example, a tone pattern such as TT11T1 or T1TT11 (where "T" represents valid tone) could be used to identify the beginning/end of the embedded data block area 342/340/342'. Embedded data block 340 may contain between 894 and 2892 bytes of data in a typical situation wherein a 36 track, 1491 characters per millimeter (cpmm) recording device is employed.

Figure 4:
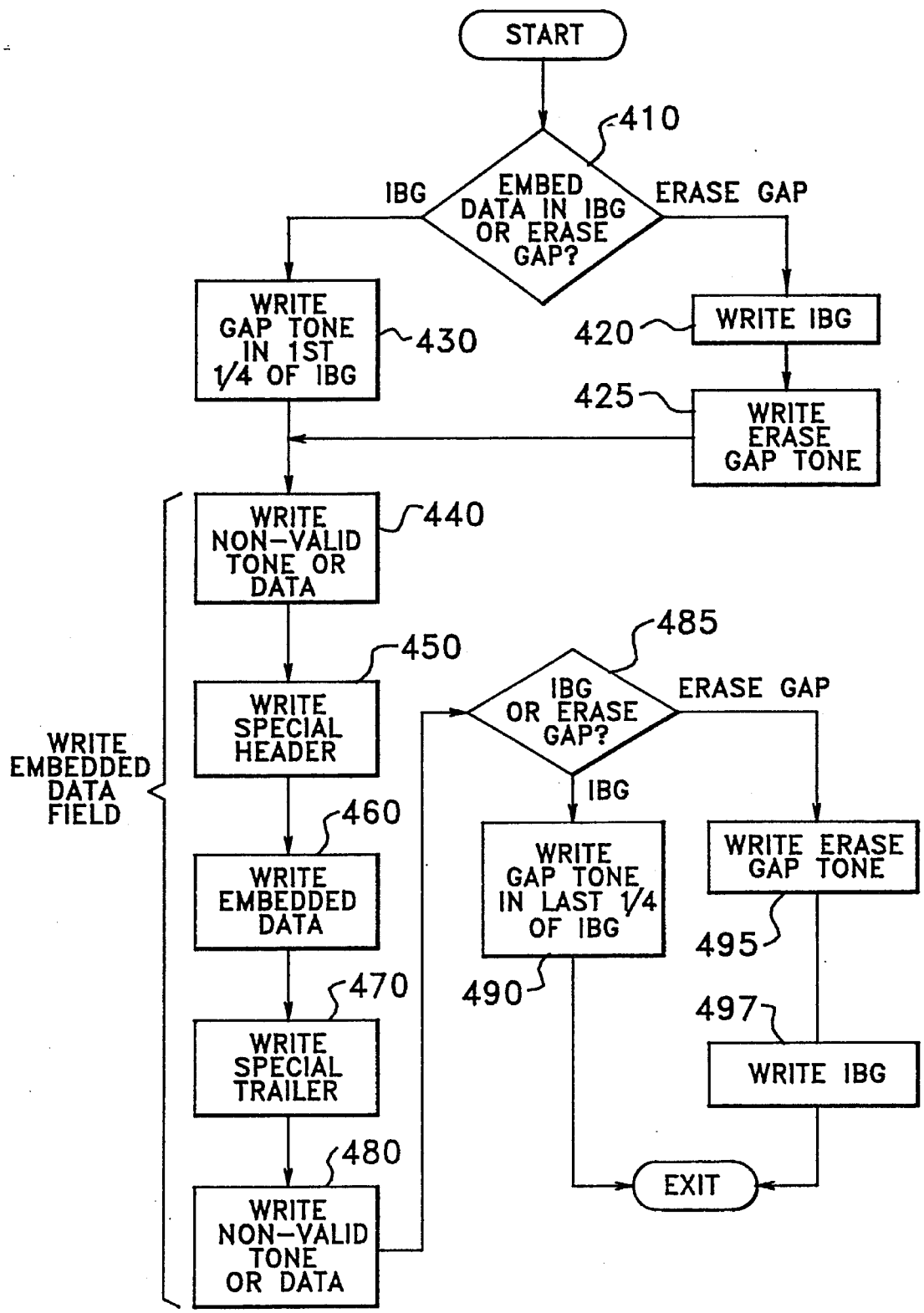
FIG. 4 is a flow chart illustrating the steps taken by the present system in order to write embedded data to a tape media recording system.
Figure 5:
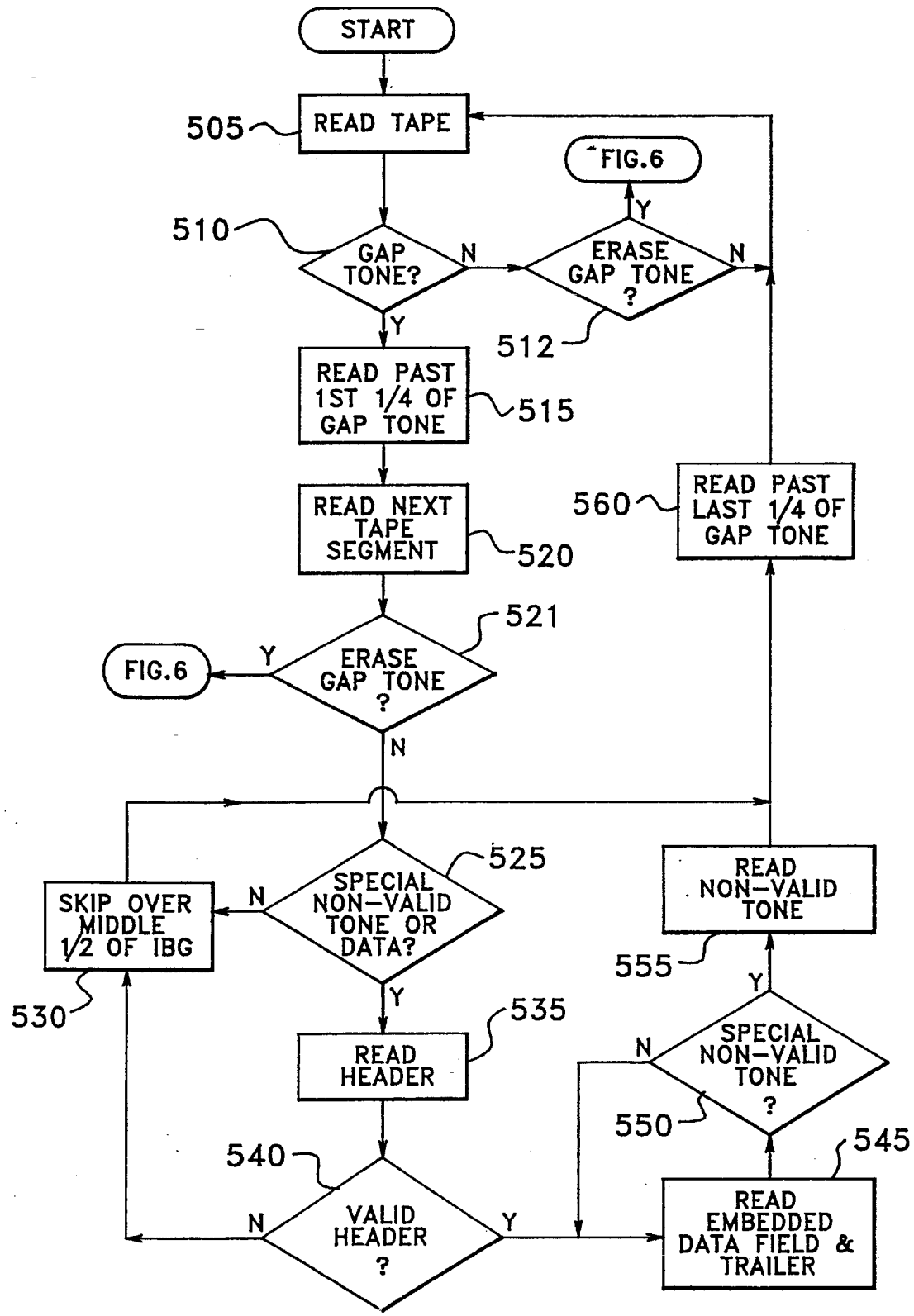
FIG. 5 is a flow chart illustrating the steps taken by the present system when a gap tone is encountered as a tape media is read.
Figure 6:
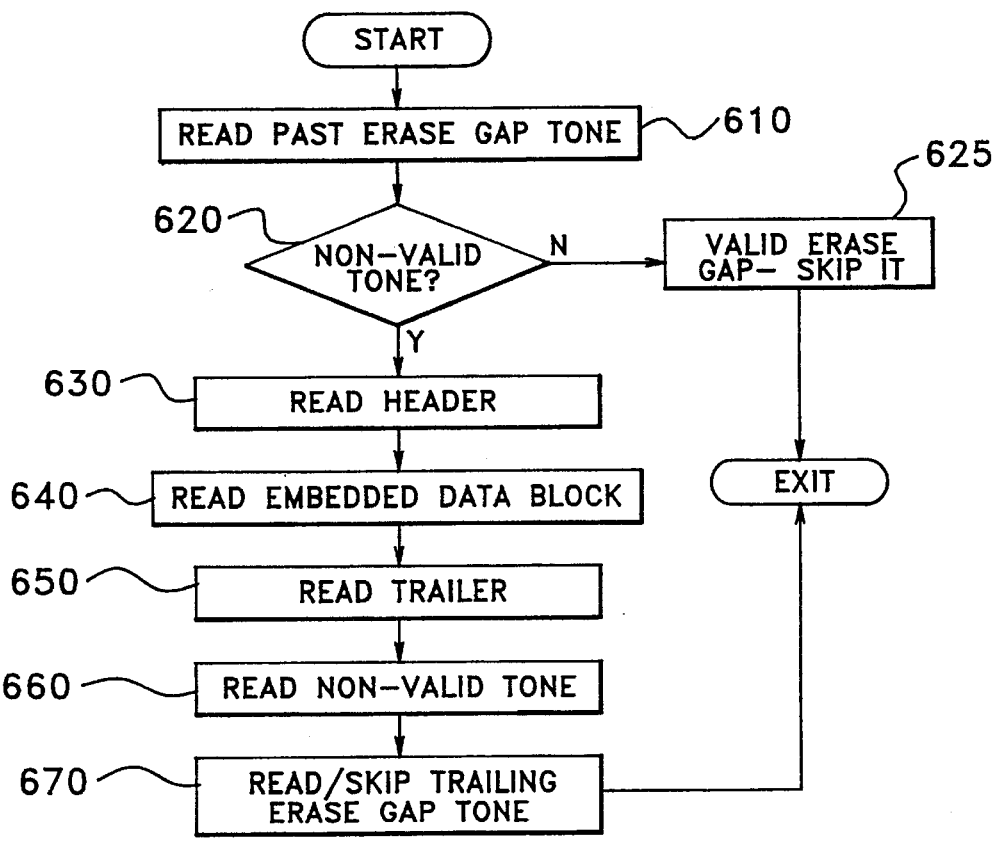
FIG. 6 is a flow chart illustrating the steps taken when an erase gap tone is encountered as a tape media is read.

In FIGS. 4, 5 and 6 (described below), it is assumed that the embedded data is padded or sized to fit within the areas of interest (e.g., IBG or erase gap) without over- or under-flow.

FIG. 4 is a flow chart illustrating the steps taken by the present system in order to write embedded data to a tape media recording system. At step 410, the decision is made whether to utilize an IBG (interblock gap) or an erase gap for embedding data within the existing tape format. If an erase gap is chosen, then at step 420, a full IBG is written, followed by an erase gap tone written at step 425. If data is to be embedded in an IBG, then at step 430, a gap tone is written in the first ¼ of the IBG. In either event (IBG or erase gap embedded data), at step 440, a non-valid tone or data pattern is written to the tape media. At step 450, a special header is written which indicates that there is, in fact, embedded data in the following area. At step 460, the particular embedded data is written to the tape media. At step 470, a special trailer is written, indicating the end of the embedded data, after which, at step 480, a trailing non-valid tone or data pattern is written. Steps 440 through 480 comprise the operation of writing an embedded data field 130. At step 485, if an IBG is being written, then a gap tone is written in the last ¼ of the IBG region, else if an erase gap is being written, then an erase gap tone followed by an IBG is written at steps 495 and 497, respectively.

FIG. 5 is a flow chart illustrating the steps taken by the present system when a gap tone is encountered as a tape media is read. At step 505, the tape media is read. If, at step 510, a gap tone is not encountered, then, at step 512, a check is made to determine if an erase gap tone is encountered. If so, then processing continues as shown in FIG. 6 (described below) If, at step 510, a gap tone is encountered, then at step 515 the first ¼ of the gap tone is read. The next area of the tape is read at step 520 to determine whether (at step 521), an erase gap tone is encountered. If so, then processing continues as shown in FIG. 6. If an erase gap was not encountered, then, at step 525, it is determined whether a special non-valid tone or data pattern is present. If a non-valid tone is not present, then there is no embedded data in this area, and the middle half of the IBG is skipped over, at step 530, and processing continues at step 560, below. If, however, a non-valid tone is encountered, then at step 535, a read operation is performed to determine whether (at step 540) a valid header 342 is present. If there is no valid header, then the IBG is skipped, as described above. If a valid header is found, then the embedded data including trailer 342' in the middle half of the IBG is read at step 545. When non-data (e.g., gap tone) is encountered at step 550, a check is then made for a non-valid tone. If it is found to be the special non-valid tone it is read at step 555, otherwise the embedded data field 130 is read at step 545. Following step 555, at step 560, the last ¼ of the gap tone is read. At this point, the tape media is typically positioned to the next "normal" data area.

FIG. 6 is a flow chart illustrating the steps taken when an erase gap tone is encountered as a tape media is read. If an erase gap tone was encountered (at step 512 in FIG. 5), then at step 610 the tape is read past the erase gap tone area. At step 620, if a non-valid tone is not encountered, then the region must be a valid erase gap, which is skipped at step 625. If, however, a non-valid tone is present, then at step 630, the header is read. Assuming that a valid header is present, then at step 640, the embedded data block is read, followed by the trailer at step 650. At step 660, a non-valid tone should be encountered, followed by a trailing erase gap tone at step 670. The tape media is advanced past these tones, and the tape media is now typically positioned to the next "normal" data area.

Error Recovery Using Embedded Data

Figure 7:
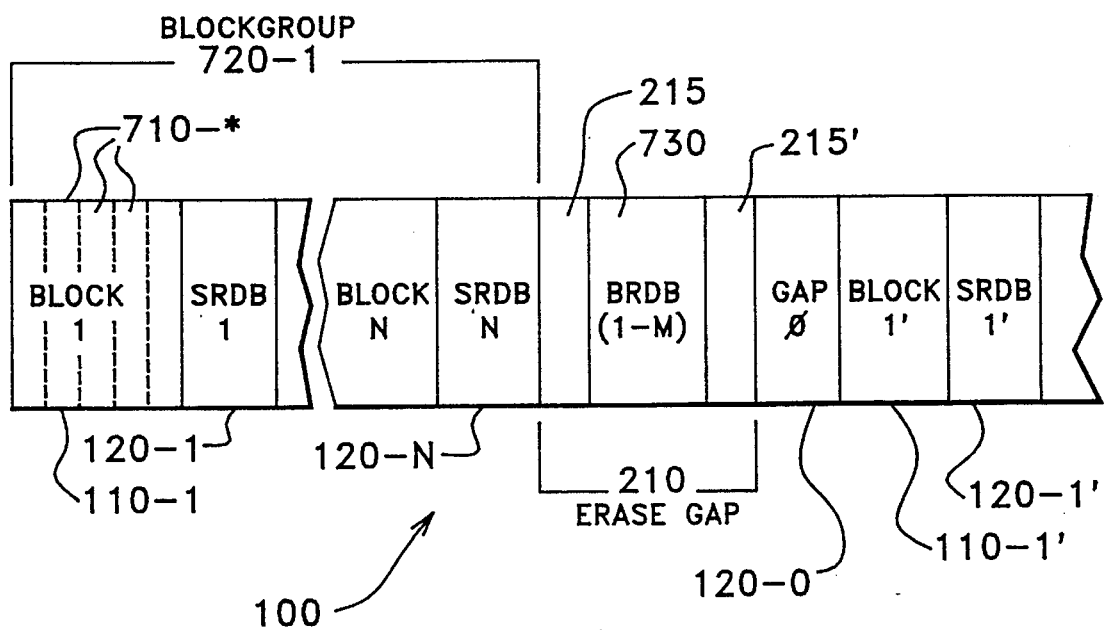
FIG. 7 illustrates the location of embedded redundancy information used by the present system for enhanced error recovery on tape media.

A specific example that illustrates one possible embodiment of the present system is shown in FIG. 7, wherein redundancy (error recovery) information is embedded in a standard tape media format to provide significantly enhanced error recovery functions.

This specific embodiment of the transparent data storage system employs logical groupings of data both across multiple data blocks and within the bounds of each of the data blocks, and then applies group redundancy techniques across those groupings. The logical groupings within the domain of a single block 110-* are called subgroups 710-*, and the logical groupings of multiple blocks are called "blockgroups" 720-1. The subgroup redundancy information, in this example, is stored in IBGs 120-* (called subgroup redundancy data blocks or "SRDB"s) and carries block information and blockgroup affiliation data (e.g., block ID, block recovery means indicator, block length, sequence number within blockgroup, blockgroup ID, etc.). The blockgroup redundancy information, in this example, is stored in erase gaps 210 (called blockgroup redundancy data blocks or "BRDB"s 730) and also includes identifying information (e.g., blockgroup ID, blockgroup sequence number, etc.).

This particular error recovery embodiment entails setting the redundancy information portions of the error encoding apart from the data portions that define the block(s) in such a way that unenhanced devices are not affected in their read or write operations, but that enhanced devices can retrieve the redundancy information when it is present and then use it for enhanced error recovery. This is accomplished by creating both subgroup and block group redundancy information as explained below.

First, redundancy information is created which relates to a single block 110-*. The redundancy information for that block is recorded in the unused section (e.g., SRDB 120-*) of media contiguous to the block. For a 34xx type tape drive device, this single block redundancy information is stored in the middle 50% of the gap following the block 110-*, since all conventional 34xx type tape drive devices allow for this area of the gap to be discontinuous.

Second, redundancy information is created across multiple blocks and recorded for those blocks in an apparently unrecordable section (e.g., BRDB 730) of media related to the physical placement of those blocks on the media. That is, for the 34xx type tape drive device, the multiple block redundancy information is stored in the erase gap 210 as described above with the erase gap following the Nth block using an N+M redundancy protocol, where M represents the number of blocks that are recoverable. Non-enhanced devices, upon sensing the erase gap, will skip over this physical section of the media. Redundancy information is therefore made transparent to non-enhanced devices by immediately preceding the information with an erase gap tone thus causing non-enhanced devices to skip over the erase gap looking for the next valid IBG gap tone which defines the location of next block of data.

The error recovery process for enhanced devices that are capable of detecting group error recovery data is invoked when the recording device is called upon to perform error recovery for a block, and the standard approach internal to the block (i.e., re-read multiple times applying ECC/CRC) proves to be inadequate. The group redundancy information is first invoked to reconstruct a limited number of subgroups of data recorded within the domain of the block to be recovered. Then the reconstructed data (subgroup by subgroup) is substituted for the respective damaged subgroups of the block and standard recovery is retried. This technique allows greater recoverability of the data while not increasing the block length nor affecting the format. When a single block or some number of blocks still cannot be recovered, each entire block can be reconstructed from the group redundancy information constructed for a blockgroup. The reconstruction process is similar to that for a single block and the reconstructed data is substituted entirely for each damaged block.

Making logical groupings (blockgroups) of the physical groupings (blocks) and applying group redundancy techniques to these logical groupings allows not only the existence of redundancy data that can be used to recover individual blocks, but also allows the redundancy information to be spatially separated (segmented) and thus less likely to be coincident with the same defect that initiated the error recovery effort in the first place.

The redundancy information for a specific block across logical groups within the block (subgroups), when embedded in the interblock gap that follows the block, is not only spatially removed but also affects neither performance (effective device data transfer rate) nor storage capacity. When it is impractical to hide the subgroup redundancy information in the interblock gap, e.g., when the device operates in a synchronous recording mode, the redundancy data should be embedded in the same manner as for blockgroup redundancy, i.e., stored in erase gaps.

The error recovery activity associated with blockgroup redundancy can be off-line to the immediate processing of the data and thereby not affect the instantaneous performance (i.e., the responsiveness of the subsystem to a data request nor the instantaneous data rate) although it will still affect the overall data transfer rate since this redundancy data must be written and at least skipped over during reading.

Figure 8:
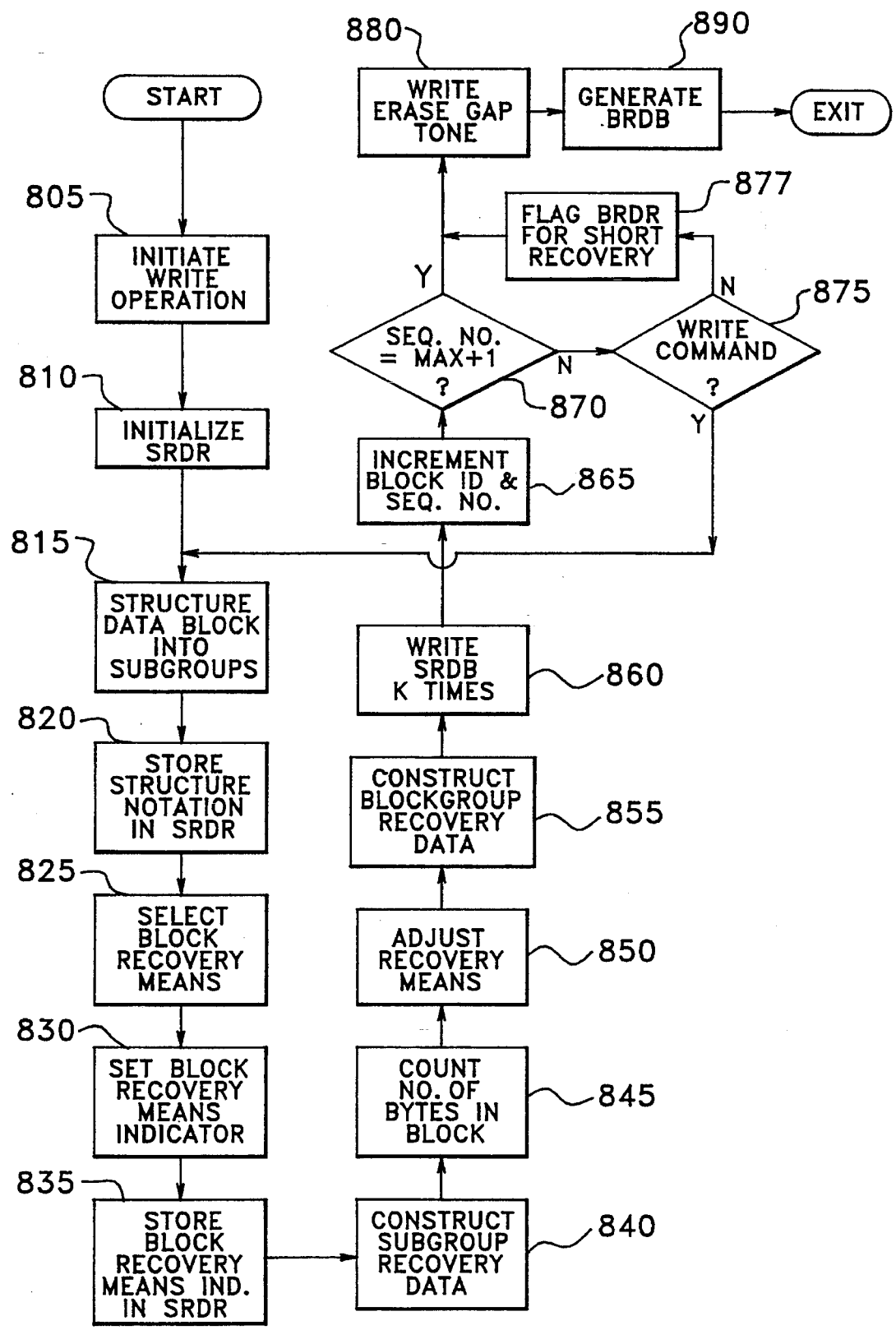
FIG. 8 is a flow chart illustrating an exemplary block-group redundancy WRITE operation.
Figure 9:
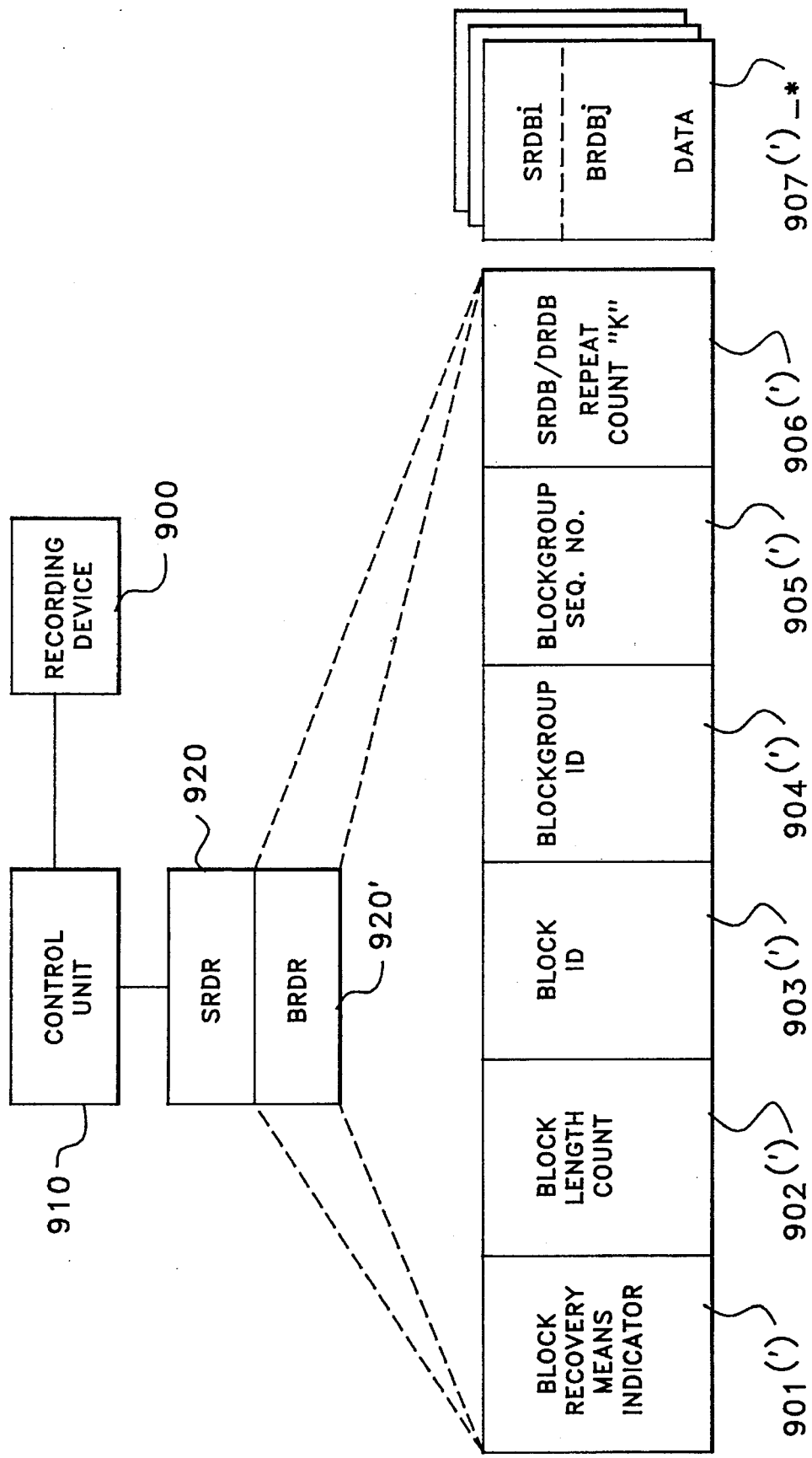
FIG. 9 is a block diagram showing the relationship between error recovery operative hardware components employing the present system.

FIG. 8 is a flow chart illustrating an exemplary blockgroup redundancy WRITE operation using the method of the present system, and FIG. 9 is a block diagram showing the relationship between the operative hardware components of the present system. Note that both the SRDR and the BRDR each contain the blocks 901/901'–907/907' shown in FIG. 9.

As shown in FIG. 8 at step 805, and also with reference to FIG. 9, the write operation is initiated when the recording device control unit 910 determines that there is at least one data block 110-* to write to the media 100. The block ID 903, blockgroup ID 904, and sequence number 904 within the blockgroup 720-1 (see FIG. 7) are initialized and stored in subgroup recovery data register (SRDR) 920 at step 810. The SRDR "register" 920 may be a hardware register or may be in the control unit memory, either specially constructed or an allocated section of the general memory or the control store in the control unit 910. The SRDR 920 is a register that holds the data that is intended to comprise the subgroup recovery data block (SRDB) 120-*.

At step 815, a given data block 110-* is structured into subgroups 710-* that relate to physical groupings inherent in the standard format of the target device/media, e.g., the 72-byte synchronization boundaries of the 3480/3490 format. At step 820, the structure notation is stored in the SRDR 920, which notation is to be used later for mapping control during a "read with reconstruction operation", if data block reconstruction is necessary.

At step 825, the initial block recovery means for the block 110-* is selected on the basis of block length history for the recent past activity to this device, e.g., multiple copy, dual copy, single redundancy group loss (EXOR), or multiple redundancy group (e.g., Reed Solomon coding). The block length history is determined by data previously written to the tape header or it can be determined from the "history" of the tape operation since the tape was last mounted, wherein such factors as subgroup size, ECC mode, block length count 902, etc., are considered. The block recovery means indicator 901 is set, at step 830, to reflect the appropriate mode of error recovery. At step 835, the block recovery means indicator 901 is stored in the SRDR 920.

At step 840, subgroup recovery data is constructed across the subgroups 710-* of the block 110-* according to the block recovery means indicator 901 in the appropriate fields of the SRDR 920 as the block 110-* is being written to the recording device 900. A count 902 of the block length is kept in the SRDR 920 while writing the block, at step 845. At step 850, the block recovery means is adjusted if necessary and the block recovery means indicator 901 and the subgroup recovery information is updated as appropriate. It may be desirable to adjust the block recovery means based on the recent "history" of the tape operation, or on the particular state of tape data integrity. At step 855, the blockgroup recovery data in the blockgroup recovery data register (BRDR) 920' is also constructed by performing an N+M recovery scheme, e.g., EXOR, Reed-Solomon code, etc. The BRDR "register" 920' may be a hardware register or may be in the control unit memory, either specially constructed or may comprise an allocated section of the control unit general memory or control store. BRDR 920' is, in a typical embodiment, an area in the tape control unit memory that holds the data that comprises the blockgroup recovery data block (BRDB) 730.

At the end of writing data, at step 855, while writing the initial gap tone (the IBG gap tone following the block just written), the SRDB repeat count 906 is identified, the fields of the SRDR 920 are concatenated and then gated into the data flow path for writing the SRDB 120-\*. SRDB 120-\* is written as described above in steps 440–480 with reference to FIG. 4.

At step 860, the SRDB 120-\* is written the appropriate number of iterations (as a function of the repeat count, K) and then normal operation of the device is resumed, e.g., writing gap tone. At step 865, the block ID 903 and sequence number 905 within blockgroup 720-\* in the subgroup recovery data register (SRDR) 920 are incremented.

If, at step 870, the sequence number within a blockgroup 720-\* is one greater than the total number of blocks 110-\* within a blockgroup 720; then step 880 (below) is performed. Otherwise, at step 875, if there is a non-write command next (issued from the host computer or stored in a queue in the tape control unit); then go to step 877, else, there must be another write command, so go back to step 815. At step 877, the BRDR is flagged for a "short recovery" operation, since the expected number of blocks within a blockgroup was not written.

At step 880, media 100 is demarked as unrecordable (e.g., a 34xx type device would write "erase gap tones") for the appropriate timing to cause the non-enhanced devices to begin a physical skip of the erase gap area.

At step 890, the BRDB 730 is then written according to the appropriate BRDB reliability approach selected at step 855 (this could be an installation option since it has capacity and performance implications), e.g., multiple copy, dual copy, single redundancy group (EXOR), or multiple redundancy group error correction (e.g., Reed Solomon coding). The BRDB is written according to the steps shown in FIG. 6.

Implementation of a blockgroup redundancy READ operation follows from the above-described WRITE operation.

High Speed Search Using Embedded Data

A specific example that illustrates another possible embodiment of the present system is shown in FIGS. 10–14 wherein high speed search information is embedded in a standard tape media format to provide significantly enhanced search functions. Present magnetic tape systems such as the IBM type 3480/3490E allow only a limited number of tape sections (i.e., sectors or shells), hereinafter called "shells", to be defined over the length of a given tape. Fewer than 100 shells can be defined for a 3480 type device, and fewer than 200 shells can be defined for a 3490E type device. These shells are thus of significant length (50 to 100 feet). Conventional search techniques locate a desired data block by first calculating an approximate shell number using variable factors such as tape tension and tape length via counting tape wraps. Since shell boundaries are only "approximately" defined, these conventional search techniques conservatively position the tape at high speed only to the desired shell number minus 2, and then complete the search at read speed. This means that a search for a given block ID generally cannot be performed at a high speed to the vicinity of a given data block, because typically two and one-half shells or 125 to 250 feet of tape must be read at a low read speed.

The present method for high speed searching specifically encodes a comparatively large number of tape location identifiers, hereinafter called high speed search vectors ("HSSVs"), on the tape at fixed intervals. These HSSVs are located in erase gap areas and can be read at high speeds by "enhanced" systems. Therefore, by using data block position information stored in the HSSVs, an enhanced system can locate a given data block much more quickly than a conventional 3480/3490E system.

Figure 10:
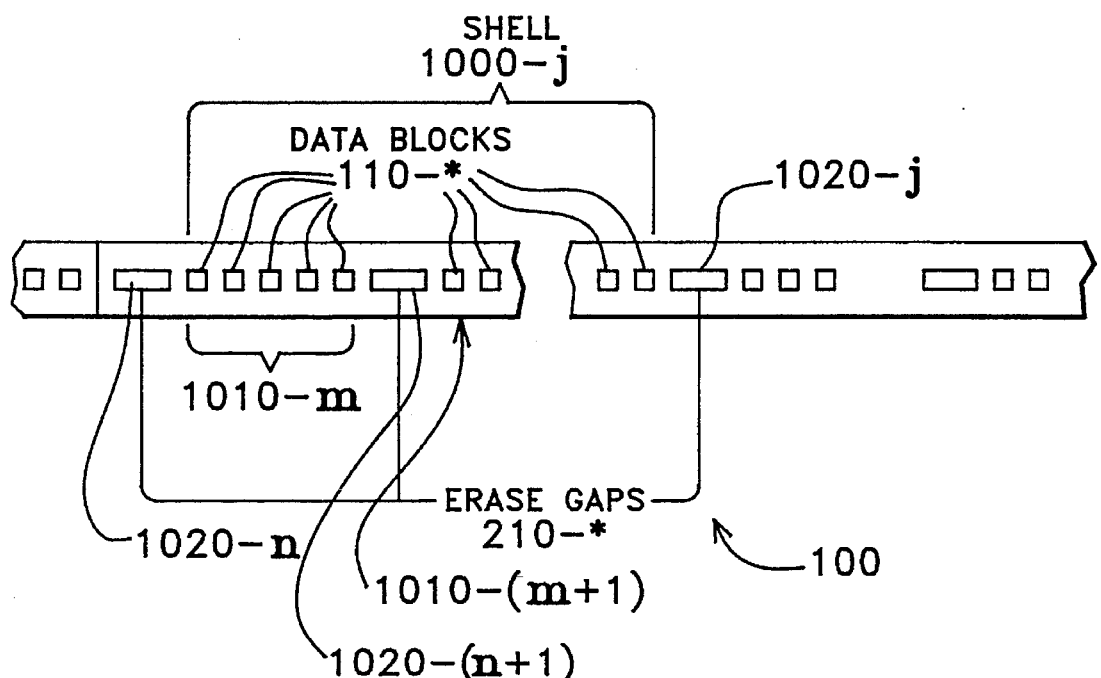
FIG. 10 is a physical view of a section of magnetic tape showing data blocks and erase gap areas used to store high speed search vector data.
Figure 11:
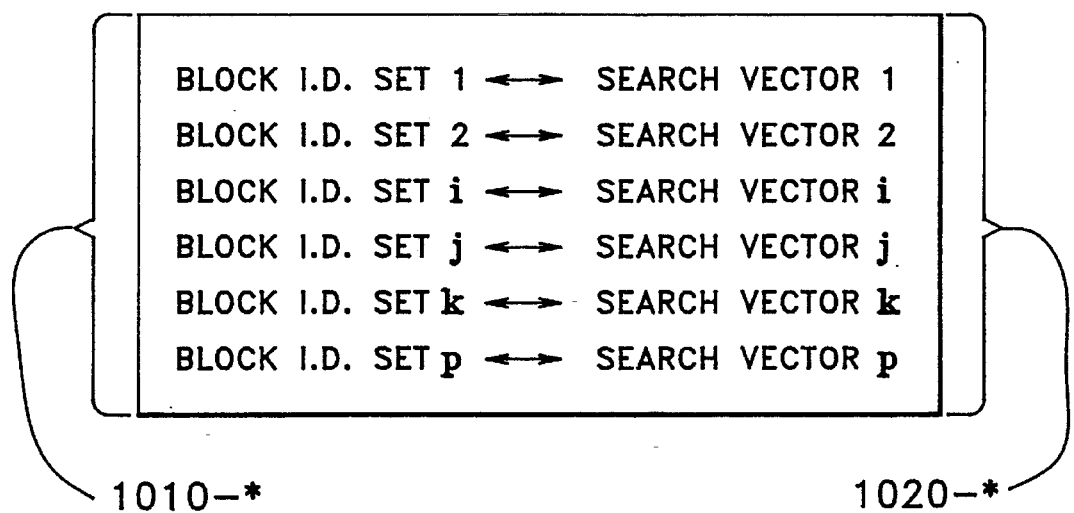
FIG. 11 is a system logical view of an entire magnetic tape using high speed search vector bounding.

FIG. 10 is a physical view of a section of magnetic tape 100 showing a shell 1000-j containing a plurality of data blocks 110-\* and erase gap areas 210-\* containing high speed search vectors, and FIG. 11 is a system logical view of an entire magnetic tape 100 on which a plurality of high speed search vectors 1020-\* have been written. As shown in FIG. 10, shell 1000-j contains a plurality of search vectors 1020-n, 1020-(n+1), etc. As explained below, the number of search vectors 1020-\* in each shell 1000-\* depends on the algorithm selected for the particular tape drive system. It can also be seen that each data block ID set 1010-\* is bounded by search vectors 1020-\*.

In the logical view shown in FIG. 11, the following definitions apply:

n=total number of possible shells on a tape; and i, j, k=integer in the range 1 to p p=total no. of possible HSSV on a tape; p≧n It is expected that i is greater than 1, and k is less than p, otherwise some of the possible advantages of using high speed search vectors are lost.

Note also that:

i=shell boundary between shell 0 and shell 1;

j=shell boundary between shell m and shell m+1 (where: 1<m+1<n); and k=the last shell boundary containing data blocks, i.e., the $k^{th}$ boundary is located between shell n−1 and shell n.

It can be seen from FIG. 11 that each set 1010-\* of block IDs has an associated search vector 1020-\* (written to tape) which identifies the location of that block ID set 1010-\*.

According to the present method, an algorithm is used to determine the fixed intervals at which to write search vectors 1020-\* that can be read at high speed and which specifically identify the tape position. For example, the tape position can be specified in terms of the number of block IDs, data bytes or gaps written from the beginning of the tape media. The position of the tape could also be specified by the length of the tape calculated by the number of tape wraps from the beginning of the tape, in a manner similar to the conventional method, except that the present method uses absolute encoding of position information rather than relative encoding. An alternate method could use the length of time that the tape is in use in write mode to specify the tape position. The algorithm used to determine the actual length of the search vector intervals can be specified by either the user or the vendor. In any event, these intervals are fixed relative to the location of data blocks, and a "read block ID" command identifies a specific fixed search location on the tape media.

Figure 12:
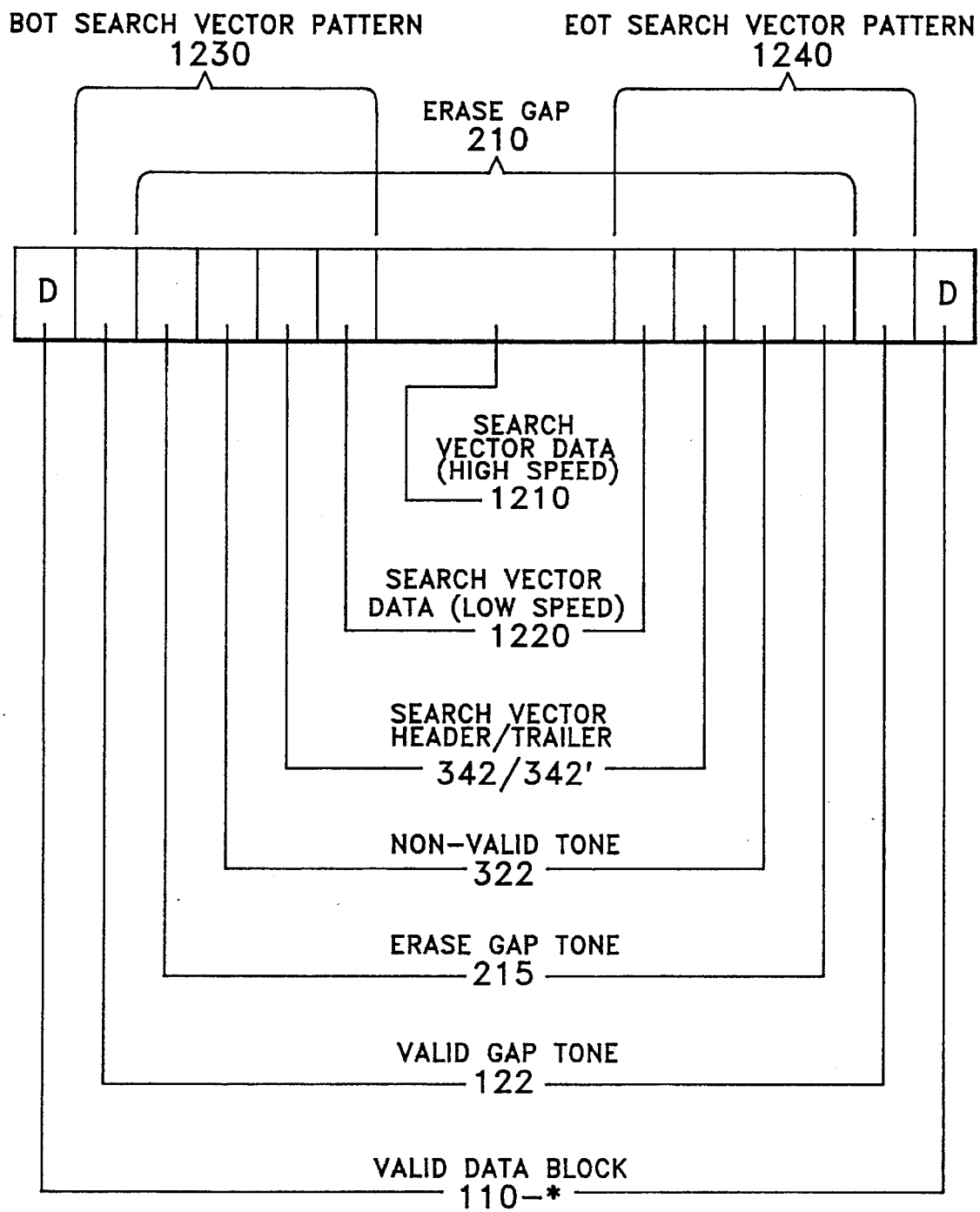
FIG. 12 is a diagram showing the format of an erase gap used to store high speed search vector data.
Figure 13:
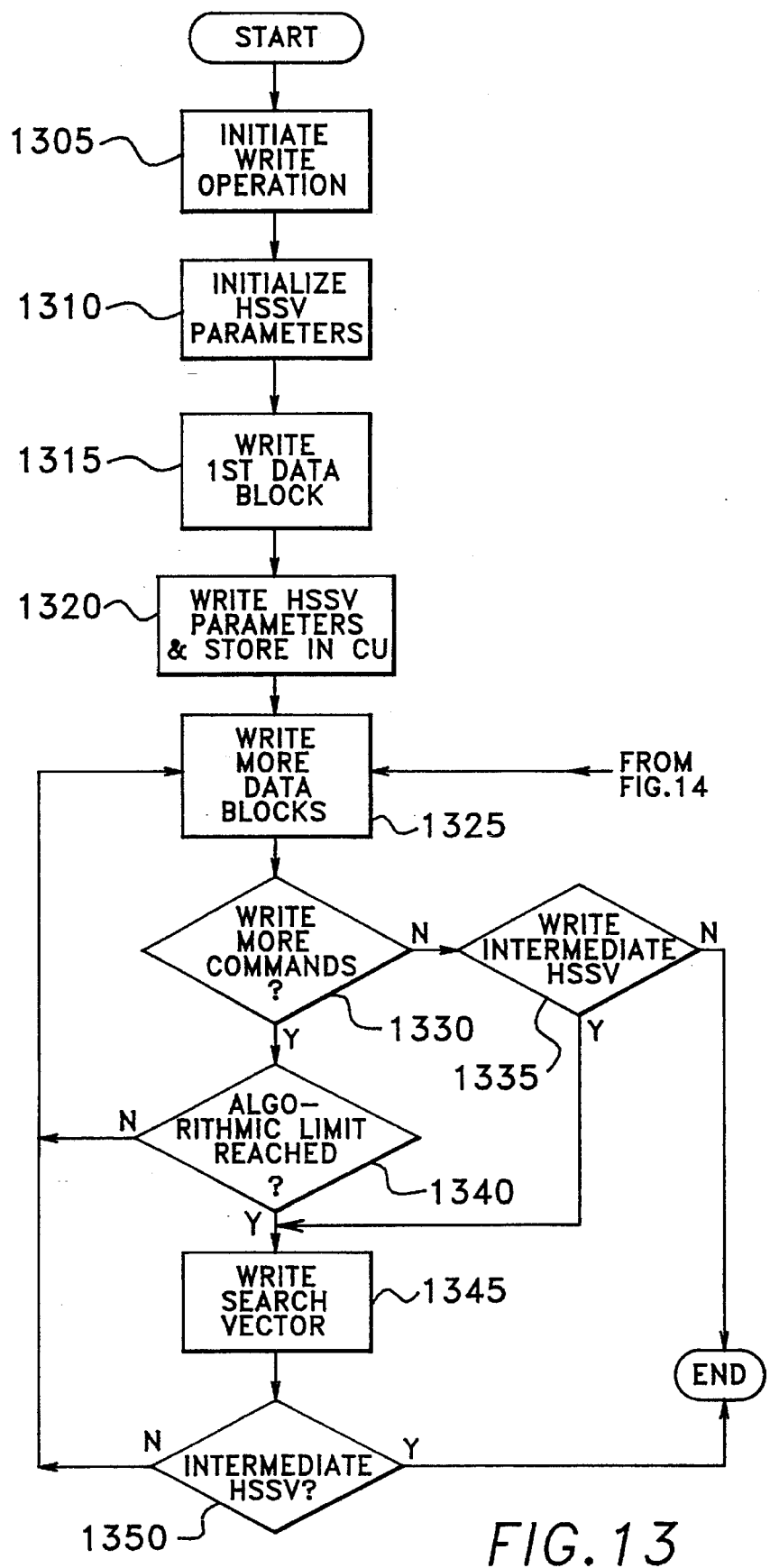
FIG. 13 is a flow chart illustrating the writing of high speed search vector data in erase gaps.

FIG. 12 is a diagram showing the format of an erase gap 210 in which search vector data 1210/1220 is stored, and FIG. 13 is a flow chart illustrating the initial writing of search vector data in erase gaps. When a block ID search operation is requested, at step 1305, the correspondence between block ID set 1010-\* containing the requested data block(s) 110-\* and the corresponding search vector number is established at step 1310 by either the host computer or by the tape drive control unit, depending on the particular implementation. After the appropriate search vector/block ID relationship has been determined, the first data block 110 is then written, at step 1315. At step 1320, a search vector 1020 is written which includes shell boundary parameters which are also written to control unit memory. Step 1320 comprises writing the following shell boundary parameter information in the order specified:

(1) gap tone 122

(2) erase gap tone 215

(3) non-valid tone 322

(4) shell boundary parameters (5) non-valid tone 322

(6) erase gap tone 215

(7) gap tone 122 (after skipping to appropriate location)

Steps 1325, 1330, and 1340 form a loop wherein data blocks 110-* are written until either a shell boundary has been reached or an HSSV boundary (i.e., the total number of data blocks specified by the algorithm) has been reached, or at step 1335, if there were too few write commands to fill the specified HSSV block ID set size, then a determination is made as to whether an intermediate search vector 1020 should be written. An intermediate search vector is a temporary search vector which is not algorithmically defined by the system and which is thus not aligned on either of the expected boundaries (i.e., an HSSV block ID set 1010-* or a shell 1000). An intermediate search vector is written in case a rewind operation, for example, is performed before filling the current HSSV 1020 with data blocks 110-*.

At step 1345, a normal search vector 1020 is written which contains the following information in the order specified:

(1) gap tone 122

(2) erase gap tone 215

(3) non-valid tone 322

(4) search vector data 1210/1220

(5) non-valid tone 322

(6) erase gap tone 215

(7) gap tone 122 (after skipping to appropriate location)

The search vector includes data written at the appropriate frequency pattern to enable reading the data at both high speed (vector data 1210) and at read speed (vector data 1220). Header/trailer information 342/342' is also included for verification purposes. Note that the search vector pattern is symmetrical about the high speed vector data 1210 as indicated by BOT search vector pattern 1230 and EOT search vector pattern 1240, which are mirror images of each other. This symmetry allows a high speed search to be performed with equal functionality in both directions.

At step 1350, if an intermediate search vector was written, then the write operation is terminated.

Figure 15:
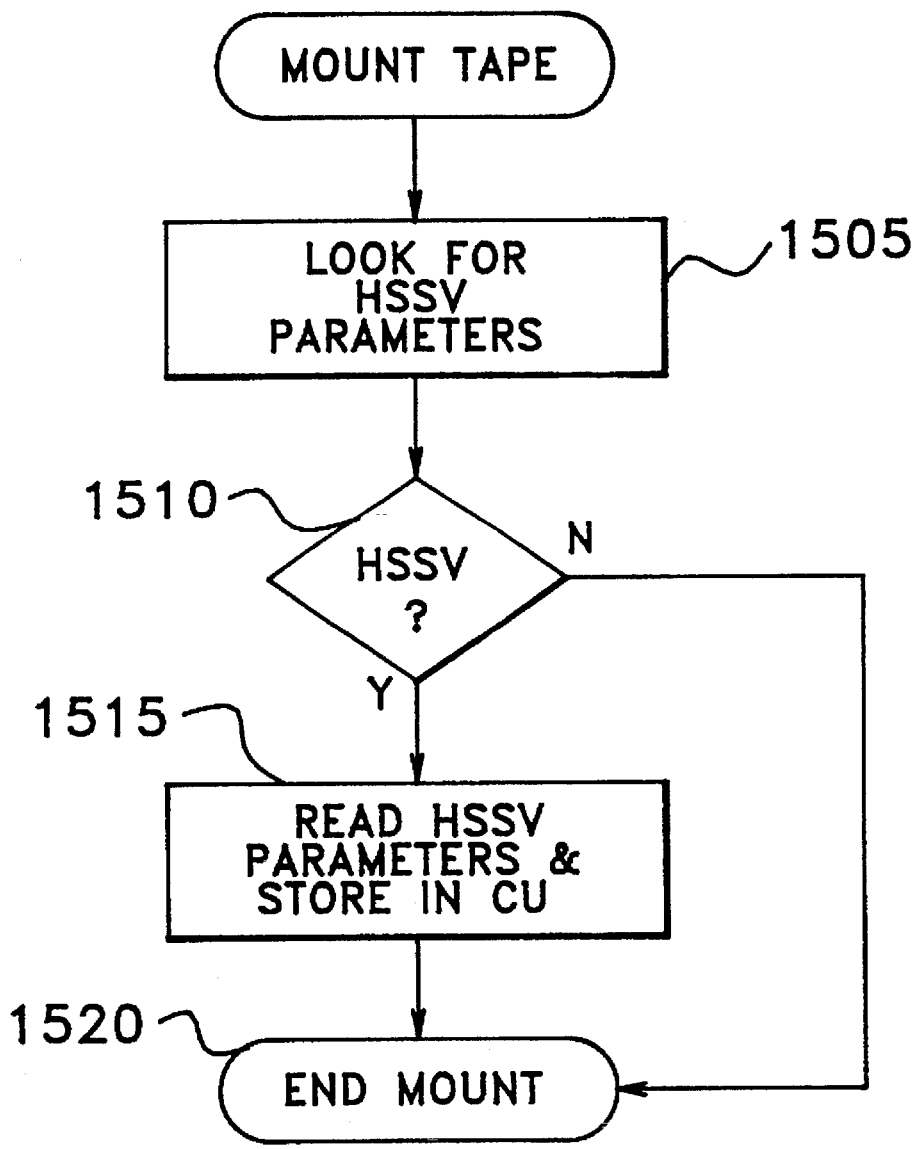
FIG. 15 is a flow chart illustrating the determination of the presence of high speed search vectors on a tape at mount time.

FIG. 15 is a flow chart illustrating the determination of the presence of high speed search vectors on a tape at mount time. At step 1505, the tape drive/control unit subsystem looks for the high speed search vector parameters in an erase gap area immediately following the first data block. At step 1510, if HSSV parameters are found, then they are stored in the tape drive control unit at step 1515, and, in either case, mount processing is completed at step 1520.

Figure 14:
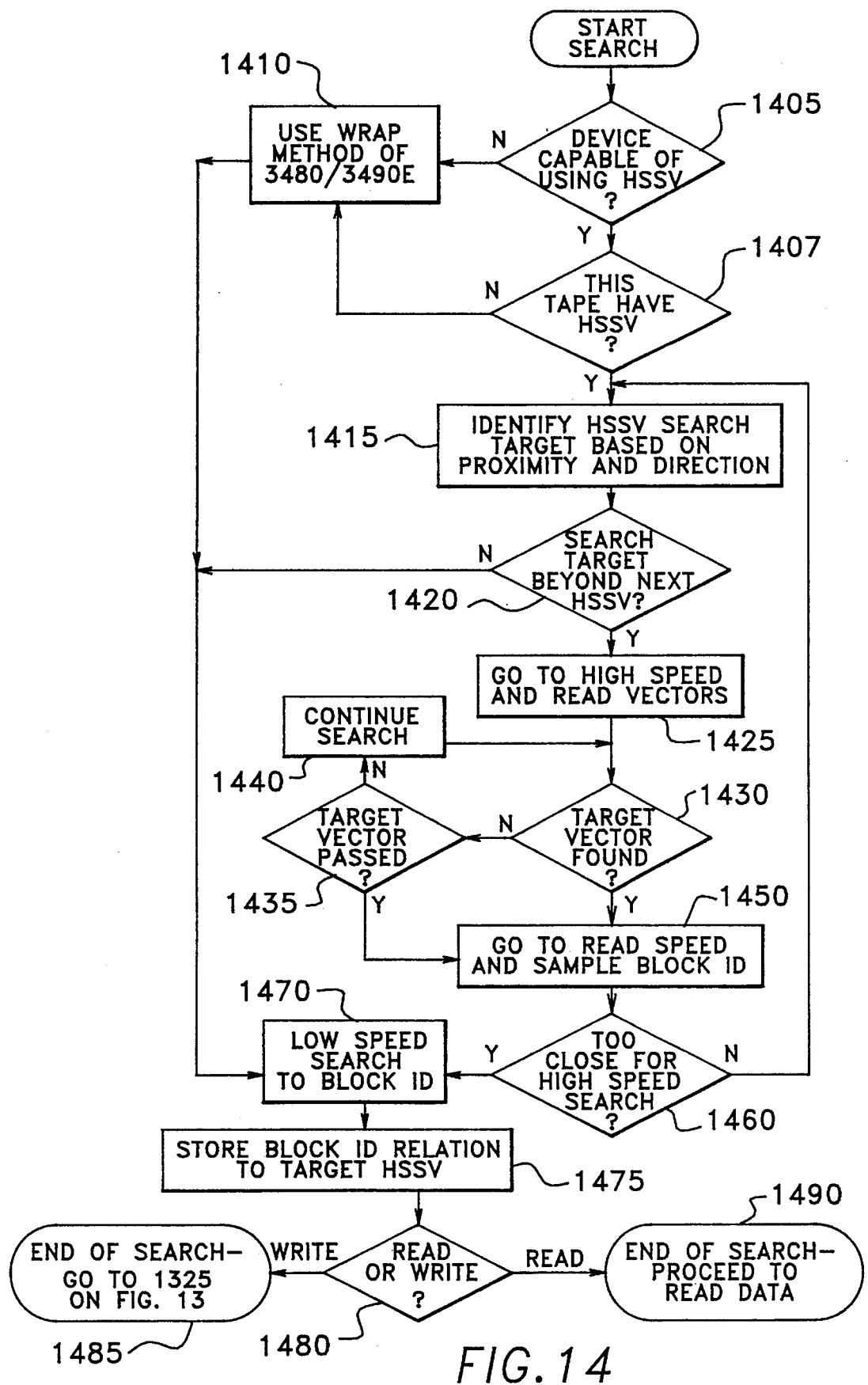
FIG. 14 is a flow chart illustrating a high speed search operation using the method of the present invention.

FIG. 14 is a flow chart illustrating a high speed search operation using the method of the present invention. At step 1405, the tape drive control unit determines whether the device is "enhanced" and can perform a high speed search using embedded data. If not, then at step 1410, a conventional search is made by counting tape wraps, which (at step 1470) is performed exclusively at read speed.

In a system having a host computer which is aware of the high speed search functionality of the present system, the host computer chains a plurality of block ID search requests. The first search request ("read block ID command") in the chain is treated identically to a conventional request giving shell locations that approximate 3480/3490E positions, thus maintaining strict compatibility between both enhanced and non-enhanced systems. For non-enhanced devices, each subsequent search request in a chain will receive data identical to the first request, since a non-enhanced device is not aware of high speed search vectors. However, for enhanced devices having a mounted tape with high speed search vectors recorded thereon, each of these subsequent requests instead contains additional high speed search vector information to provide finer granularity so that the enhanced devices may perform a high speed search up to the start/stop capabilities of the particular device. This additional information, for example, block ID set-search vector mapping, would not be given to a non-enhanced device.

If the device is capable of a high speed search using HSSVs, then, at step 1407, a check is made to determine whether this tape in fact has any high speed search vectors recorded on it. If an erase gap containing non-valid tone followed by a search vector header was not found when the tape was mounted, then processing continues at step 1410, where a conventional search is performed.

If it is determined that the tape contains high speed search vectors, then at step 1415, the target search vector 1020-* is identified which delineates the data block ID set 1010-* containing the desired data block(s) 110-*. If the desired data block is located within the present block ID set 1010-*, then a low speed search is performed to the desired data block, at step 1470. Otherwise, at step 1425, a loop including steps 1430, 1435 and 1440 is executed, wherein the appropriate number of high speed search vectors 1020 are read until the target search vector 1020-* is either located or passed. In either event, at step 1450, the next block ID is read at read speed, and at step 1460, a determination is made as to whether the tape is too close to the desired block ID for a high speed search to be continued. If the tape is too close, then a low speed search (step 1470) to the block ID is made. Otherwise, processing is resumed at step 1415.

After the initial block is reached at step 1475, the relation between the present block ID and the target high speed search vector is stored in the tape drive control unit. At step 1480, if a write operation is in progress, then (from block 1485) the operation continues at 1325 on FIG. 13. Otherwise, if a read operation was requested, the desired data is read at step 1490.

It is to be understood that the claimed invention is not limited to the description of the preferred embodiment, but encompasses other modifications and alterations within the scope and spirit of the inventive concept.

We claim:

1. In an enhanced data recording system for recording data on media having a predefined data format including reserved areas designated by said predefined data format as not of interest with respect to recordation of data therein, a method of storing supplementary data in such a manner that the supplementary data is transparent to an unenhanced data recording system, said method comprising the step of:

storing said supplementary data, including an embedded data field, in said reserved areas ignored by said unenhanced data recording system.

2. In a data recording system employing media having a predefined data format including reserved areas designated by said predefined data format as not of interest with respect to recordation of data therein, a method of enhancing said data recording system to store supplementary information in such a manner that the supplementary information is transparent to an unenhanced data recording system, said method comprising the steps of:

(a) providing a template indicating a format for storing said supplementary information, including an embedded data field, in said reserved areas;

(b) writing said supplementary information in said reserved areas ignored by said unenhanced data recording system according to said format of said template;

(c) checking for the presence of the said supplementary data in said reserved areas of said media; and (d) utilizing, responsive to detecting the presence of said supplementary data, said supplementary data to enhance the operation of said enhanced data recording system.

3. The method of claim 2, wherein said supplementary information is used to provide an enhanced recording system function.

4. The method of claim 2 wherein said embedded data field includes delimiting indicia on at least one side thereof.

5. The method of claim 4, wherein said delimiting indicia includes a non-valid tone preceding said embedded data field.

6. The method of claim 4, wherein said delimiting indicia includes header information for verifying the presence of said embedded data field.

7. The method of claim 2, wherein said embedded data field is located in an interblock gap.

8. The method of claim 2, wherein said embedded data field is located in an erase gap.

9. The method of claim 2, wherein said media is rotating media, and said reserved areas are alternative spare recording areas.

10. The method of claim 2, wherein said reserved areas are areas specifically marked by said data recording system as being unrecordable areas.

11. The method of claim 2, wherein said reserved areas are predefined as areas devoid of data.

12. The method of claim 2, wherein said predefined data format is an industry standard format.

13. The method of claim 12, wherein said industry standard format is selected from the group comprising an ANSI standard format, an ISO format, and an ECMA format.

* * * * *

UNITED STATES PATENT AND TRADEMARK OFFICE
CERTIFICATE OF CORRECTION

PATENT NO. : 5,619,384

DATED : April 8, 1997

INVENTOR(S) : Michael L. Leonhardt and Charles A. Milligan

It is certified that error appears in the above-identified patent and that said Letters Patent is hereby corrected as shown below:

Title page, item[*] change as follows:

--Notice: The term of this patent shall not extend beyond the expiration date of Pat. No. 5,570,242.--

Signed and Sealed this

Fifth Day of August, 1997

Attest:

BRUCE LEHMAN

*Attesting Officer*    *Commissioner of Patents and Trademarks*